US008265060B2

(12) United States Patent
Mahendran et al.

(10) Patent No.: US 8,265,060 B2
(45) Date of Patent: Sep. 11, 2012

(54) PACKET DATA FILTERING

(75) Inventors: Arungundram C. Mahendran, Irvine, CA (US); Raymond Tah-Sheng Hsu, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1186 days.

(21) Appl. No.: 11/180,130

(22) Filed: Jul. 12, 2005

(65) Prior Publication Data
US 2006/0062238 A1 Mar. 23, 2006

Related U.S. Application Data

(60) Provisional application No. 60/588,664, filed on Jul. 15, 2004.

(51) Int. Cl.
*H04L 12/66* (2006.01)
(52) U.S. Cl. ............. 370/352; 370/338; 370/388; 713/1
(58) Field of Classification Search .................. 370/352, 370/388, 338; 713/1
See application file for complete search history.

(56) References Cited

U.S. PATENT DOCUMENTS

| | | | |
|---|---|---|---|
| 5,081,678 A | 1/1992 | Kaufman et al. | |
| 7,120,930 B2 | 10/2006 | Maufer et al. | |
| 7,496,748 B2 | 2/2009 | Mercer et al. | |
| 7,562,393 B2 * | 7/2009 | Buddhikot et al. | ............. 726/26 |
| 2002/0080752 A1 | 6/2002 | Johansson et al. | |
| 2003/0021252 A1 | 1/2003 | Harper et al. | |
| 2003/0060210 A1 * | 3/2003 | Ravishankar et al. | ........ 455/452 |
| 2003/0097584 A1 | 5/2003 | Haukka et al. | |
| 2004/0008632 A1 | 1/2004 | Hsu et al. | |
| 2004/0109459 A1 | 6/2004 | Madour et al. | |
| 2004/0190522 A1 * | 9/2004 | Aerrabotu et al. | ......... 370/395.3 |
| 2004/0210766 A1 | 10/2004 | Kroselberg | |
| 2005/0165917 A1 * | 7/2005 | Le et al. | ........................ 709/220 |
| 2005/0223228 A1 | 10/2005 | Ogawa et al. | |

FOREIGN PATENT DOCUMENTS

| | | |
|---|---|---|
| EP | 1249980 A2 | 10/2002 |
| EP | 1289227 A2 | 3/2003 |
| JP | 2004180155 | 6/2004 |
| JP | 2005529554 | 9/2005 |
| KR | 100899960 | 5/2009 |
| WO | WO02056562 A1 | 7/2002 |
| WO | WO03085904 A1 | 10/2003 |
| WO | WO2004045159 | 5/2004 |

OTHER PUBLICATIONS

International Search Report—PCT/US05/025147—International Search Authority, European Patent Office,Nov. 22, 2005.

(Continued)

*Primary Examiner* — Quynh Nguyen
(74) *Attorney, Agent, or Firm* — Kam T Tam; Kristine U Ekwueme

(57) ABSTRACT

In a packet data communication system in which communicating nodes assume different modes of communications, and packet data are sent through a monitoring intermediary for data traffic control, the different modes of communications are directly sent to the monitoring intermediary so as to allow the monitoring intermediary to straightforwardly set up data filters for carrying out the data control and monitoring functions.

35 Claims, 4 Drawing Sheets

OTHER PUBLICATIONS

Nenning Schulzrinne, Jonathan Rosenberg: "The Session Initiation Protocol: Internet-Centric Signaling" IEEE Communications Magazine, 'Online! Oct. 2000, pp. 134-141, XP002352523.

O. Egashira, "IPSec and ISAKMP Analysis Software—Utilised for VPN Equipment Interconnect Testing", Interop Magazine (Softbank Publishing Ltd.), vol. 9, 9 (Nov. 1, 1999)pp. 139.

Written Opinion—PCT/US05/025147—International Search Authority, European Patent Office,Nov. 22, 2005.

Y. Kobayashi, "Practical References ofVPN Service", Computer & Network, (Ohmsha, Ltd.), vol. 21, 3 (Mar. 1, 2003), pp. 25-40.

Taiwan Search Report—TW094124016—TIPO—Nov. 23, 2011.

* cited by examiner

PACKET DATA FILTERING

I. CLAIM OF PRIORITY UNDER 35 U.S.C §119

The present application for patent claims priority to U.S. Provisional Application No. 60/588,664, entitled "Service Based Bearer Control for Mobile IP Co-located Care of Address," filed on Jul. 15, 2004, and assigned to the assignee hereof and expressly incorporated by reference herein.

II. REFERENCE TO CO-PENDING APPLICATION FOR PATENT

The present invention relates to U.S. patent application Ser. No. 11/180,131 entitled "Bearer Control of Encrypted Data Flows in Packet Data Communications," filed concurrently herewith, and assigned to the assignee hereof and expressly incorporated by reference herein.

BACKGROUND

I. Field

The present invention generally relates to packet data communications, and more particularly, to monitoring and controlling of packet data during packet data communications.

II. Background

Interconnecting of networks globally allows information to be swiftly accessed irrespective of geographical distances. FIG. 1 shows a simplified schematic drawing of the global connection of networks, commonly referred to as the Internet signified by the reference numeral 20. The Internet 20 is in essence many networks with different levels of hierarchy linked together. The Internet 20 is operated under the IP (Internet Protocol) promulgated by the IETF (Internet Engineering Task Force). Details of the IP can be found in RFC (Request For Comments) 791 published by the IETF.

Connected to the Internet 20 are various individual networks, sometimes called LANs (Local Area Networks) or WANs (Wide Area Networks) depending on the network sizes. Shown in FIG. 1 are some of such networks 22, 24 and 26.

Within each of the networks 22, 24, and 26, there can be various pieces of equipment connected to and in communication with each other. Examples are computers, printers, and servers, to name just a few. Each piece of equipment has a unique hardware address, commonly called the MAC (Media Access Control) address. The piece of equipment with the MAC address is sometimes called a node. When the node communicates beyond its own network via the Internet 20, an IP address needs to be assigned to the node.

The assignment of the IP address can be manual or automatic. The manual assignment of the IP address can be performed by a network administrator, for example. More often, the IP address is automatically assigned. For instance, in a LAN, the IP address can be assigned by a server called the DHCP (Dynamic Host Control Protocol) server (not shown) residing inside in the node's LAN. Furthermore, in a WAN which supports wireless technologies, IP addresses can be assigned automatically and remotely.

Returning now to FIG. 1, as an example, suppose a node 30 in the network 22 attempts to send a data packet to another node 34 in the network 24. Under the IP, each data packet needs to have a source address and a destination address. In this case, the source address is the address of the node 30 in the network 22. The destination address is the address of the node 34 in the network 24. Operating in such a manner, the nodes 30 and 34 are said to be communicating under the Simple IP communication mode in which both nodes 30 and 34 simply use their own IP addresses in the exchange of data packets to conform with the IP.

Advent in wireless technologies allows nodes to move away from their originally registered network to another network. For instance, referring back to FIG. 1, the node 30, instead of permanently wired to the network 22, can be a wireless device, such as a PDA (Personal Device Assistant), a cellular phone, or a mobile computer. The wireless node 30 can travel beyond the boundary of its home network 22. Thus, the node 30 may roam away from its home network 22 to a foreign network 26. Under such scenario, the original address assigned to the node 30 would no longer be applicable to the node 30. As such, data packets destined for that address of the node 30 may not be reachable to the node 30.

The Mobile IP (Mobile Internet Protocol) set forth by the IETF is intended to address the node mobility problems. In accordance with the RFC 2002 published by the IETF, whenever away from the home network 22 and roaming in another network, the node 30 is assigned a "care-of address," abbreviated as CoA (Care-of Address).

Under the RFC 2002, there are two types of CoA, namely, the FA CoA (Foreign Agent Care-of Address) and the CCoA (Co-located Care of Address).

The FA CoA is in essence the address of a FA (Foreign Agent) which is a designated server in the foreign network where the node 30 is located at. The use of the FA CoA is applicable in the IPv4.

The CCoA is an individual but temporary address assigned to the node 30 by the foreign network. The use of the CCoA is applicable in both the IPv4 and IPv6.

In any case, anytime the node 30 is in a foreign territory, the node 30 must register the CoA, be it the FA CoA or the CCoA, with its home network 22, so that the home network 22 always knows the whereabouts of the node 30. After registration, the CoA is stored in the routing table maintained by a designated server, called the HA (Home Agent) 25 of the home network 22.

Take a couple of examples for illustration.

For the case of the FA CoA, suppose the node 30 roams into the foreign network 26. Upon reaching the territorial limit of the foreign network 26, the node 30 receives an advertisement message from the foreign network 26 informing the node 30 of its presence in the foreign territory. From the advertisement message, the node 30 knows the address of the FA 36 of the foreign network 26. The node 30 then registers the FA CoA with the HA 25 in the home network 22.

When the node 30 in the foreign network 26 sends out a data packet to the node 34 in the network 24, for example, knowing the address of the node 34 in the network 24, the data packet can be sent straightforwardly. That is, in accordance with the IP, in the data packet, the source address can be set to the HoA of the node 30 and the destination address can be set to the address of the node 34 in the network 24. The direction of the data packet is shown as data path 38 shown in FIG. 1.

As for the reverse data traffic, it is not as straightforward. In the reverse data route, when the node 34 in the network 24 attempts to send a data packet to the node 30, now in the foreign network 26, as mentioned above, in conformance with the IP, both the source and the destination addresses must be specified in the data packet. In this case, the source address is the IP address of the node 34 in the network 24. As for the destination address, without any update notice from the node 30, the node 34 only knows the HoA of the node 30, not the FA CoA of the node 30. Thus, the destination address will be set to the HoA of the node 30. Nevertheless, since the FA CoA of the node 30 is stored in the routing table of the HA 25 in the home network 22, when the data packet reaches the home network 22, the HA 25 of the network 22 encapsulates the received data packet with the stored FA CoA and sends it to the node 30 in the foreign network 26. That is, the encapsulated data packet utilizes the FA CoA as the destination address. Once the foreign network 26 receives the encapsulated data packet, the FA 36 merely strips away the encapsulated FA CoA and delivers the original packet to the mobile node 30. The route of the data packet is shown as data path 40 in FIG. 1.

It also should be noted that the data paths, such as the paths 38 and 40, in reality pass through the Internet 20 many times. For the sake of clarity so as not to obscure FIG. 1, the paths merely are shown as passing through the relevant servers, such as the HA 25 and the FA 36. That is, the data paths 38 and 40 are shown as logical paths as shown in FIG. 1.

Operating in the manner as described above, the mobile node 30 is said to be communicating with the correspondent node 34 under the Mobile IP tunnel mode using the FA CoA.

As for the case of the CCoA, when the node 30 roams away from the home network 22, instead of requesting for a FA CoA, the node 30 can instead request a CCoA from the foreign network. If the network 26 is a WAN supporting wireless technologies such as the cdma2000 standards promulgated by the TIA/EIA (Telecommunications Industry Association/Electronic Industries Association), the CCoA can be requested and assigned remotely by the foreign network 26 via the PPP (Point-to-Point Protocol) between a PDSN (Packet Data Serving Node) 41 and the mobile node 30, for example. The PDSN 44 is basically a server in the network 36 serving and processing data traffic in the wireless portion of the network 26. Furthermore, it should also be noted that the PDSN 41 and the FA 36 can be integrated as one entity, instead of being separate. However, other than the assignment of the CCoA by the foreign network 26, the node 30 performs all the functions of a foreign agent, such as the FA 36 as mentioned previously. Again, the mobile node 30 needs to register the CCoA with the home network 22.

For instance, to correspond with node 34 in the network 24, the node 30 sends out a data packet with two layers of addresses. In the outer layer, the source address is set to the CCoA, and the destination address is set to the HA 25. In the inner layer, the source address is the HoA of the node 30 and the destination address is the address of the node 34 in the foreign network 24. Upon receipt of the data packet from the roaming node 30, the HA 25 strips off the outer address layer and sends the data packet to the node 34 with the inner address layer. The logical path of the data packet is shown as data path 42 in FIG. 1.

In the reverse data path, that is, when the node 34 sends a data packet to the node 30, the data packet has only one address layer with the source address set to the node 34 and the destination address set to the HoA of the node 30. Upon receipt of the data packet, the HA 25 encapsulates the data packet with the CCoA as the destination address and the address of the HA 25 as the source address and sends the encapsulated data packet to the node 30. The node 30 performs the de-encapsulating on its own without going through the FA 36. The direction of the data packet is shown as data path 44 in FIG. 1.

Operating in the manner as described above, the roaming node 30 is said to be communicating with the correspondent node 34 under the Mobile IP tunnel mode using the CCoA.

The advantage of communicating via the Mobile IP tunnel mode using the CCoA is, for example, when the mobile node 30 migrates to yet another foreign network, there is no need for the mobile node 30 to send any update notice to the correspondent node 34. Since the mobile node 30 always updates its whereabouts with the home network 22, data packets sent by the corresponding node 34 are always routed to the HA 25 which in turn reroutes the data packets to the most current location of the mobile node 30.

Operating via the Mobile IP tunnel mode using the CCoA involves considerable degree of data traffic detours as can be seen from the meandering logical data paths 42 and 44 in FIG. 1.

Suppose, the mobile node 30 roams to the foreign network 26 which is geographically close to the remote network 24 but far away from the home network 22. For the mobile node 30 in the foreign network 26 to communicate with the corresponding network 34, it would be an inefficient use of resources for the data traffic to loop through the faraway home network 22 before reaching the nearby corresponding node 34.

Instead, under the Mobile IP, another mode of communications is available. To invoke this mode, once the mobile node 30 reaches a new foreign territory, in addition to update its whereabouts with the home network 22, the mobile node 30 needs to update its new locale with any correspondent node, such as the corresponding node 34.

Operating under this communication mode, data traffic between the mobile node 30 and the corresponding node 34 is exchanged straightforwardly. Specifically, when a data packet is sent by the mobile node 30 to the correspondent node 34, the source address is set to the CCoA of the mobile node 30, and the destination address is set to the address of the node 34 in the foreign network 24. As for the reverse data traffic, for each data packet, the corresponding node 34 uses its address as the source address and the CCoA of the mobile node 30 as its destination address. The logical paths of the data packets are shown as data paths 46 and 48 in FIG. 1. Operating in the manner as depicted above, the mobile node 30 is said to be communicating with the corresponding node 34 under the Mobile IP route optimized mode using CCoA.

Very often, the different communication modes of the nodes need to be ascertained and monitored for different reasons. For example, when the mobile node 30 and the corresponding node 34 is in a VoIP (Voice over IP) session, it needs to be certain that the participating parties, the mobile node 30 and the corresponding node 34 in this case, are authorized. If the VoIP session is fee-based, the data traffic between the parties needs to be monitored for purpose of accounting. Unauthorized data traffic is simply blocked or rejected. Data packet formats are different under different communication modes. Heretofore, monitoring of data traffic is via first inspecting each data packet, determining its mode of communications, extracting relevant information, and thereafter setting up appropriate criteria to allow or reject data packets to pass through. Such practice is resources intensive, not to mention the additional latency added to the data traffic.

Accordingly, there is need to provide better data traffic monitoring for packet data communications.

SUMMARY

In a packet data communication system in which communicating nodes assume different modes of communications, efficient and accurate monitoring of the traffic packet data is needed. Instead of inspecting each data packet to derive necessary information to arrive at a set of criteria for data traffic monitoring, in accordance with an exemplary embodiment of the invention, the necessary information is straightforwardly sent to a monitoring intermediary to set up data filters for carrying out the data control and monitoring functions.

In the exemplary embodiment, a mobile node sends its selected mode of communications along with other information required in each data packet to a monitoring intermediary during the initial signaling process. The correspondent node responds in its response signaling process with similar information. Operating as arranged, the monitoring intermediary can relatively swiftly and efficiently set up data filters to carry out the data control and monitoring funtions.

These and other features and advantages will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The embodiments described below are operable according to the IMS/MMD (IP Multimedia Subsystem/Multimedia Domain) standards promulgated by the $3^{rd}$ Generation Partnership Project (3GPP) and the $3^{rd}$ Generation Partnership Project 2 (3GPP2). A general discussion of the IMS/MMD can be found in published documents, entitled "$3^{rd}$ *Generation Partnership Project: Technical Specification Group Services and System Aspects, IP Multimedia Subsystem (IMS), Stage 2*," 3GPP TS 23.228; "$3^{rd}$ *Generation Partnership Project: Technical Specification Group Core Network, End-to-End Quality of Service (QoS) Signaling Flows*," 3GPP TS 29.208; and "*IP Multimedia System, Stage 2*," X.S0013-002 and 3GPP2 X.P0013-012.

IMS is applicable in a wide variety of standards such as the cdma2000, WCDMA (Wideband Code Division Multiple Access), GPRS (General Packet Radio Service), and various other WANs.

Figure 1:
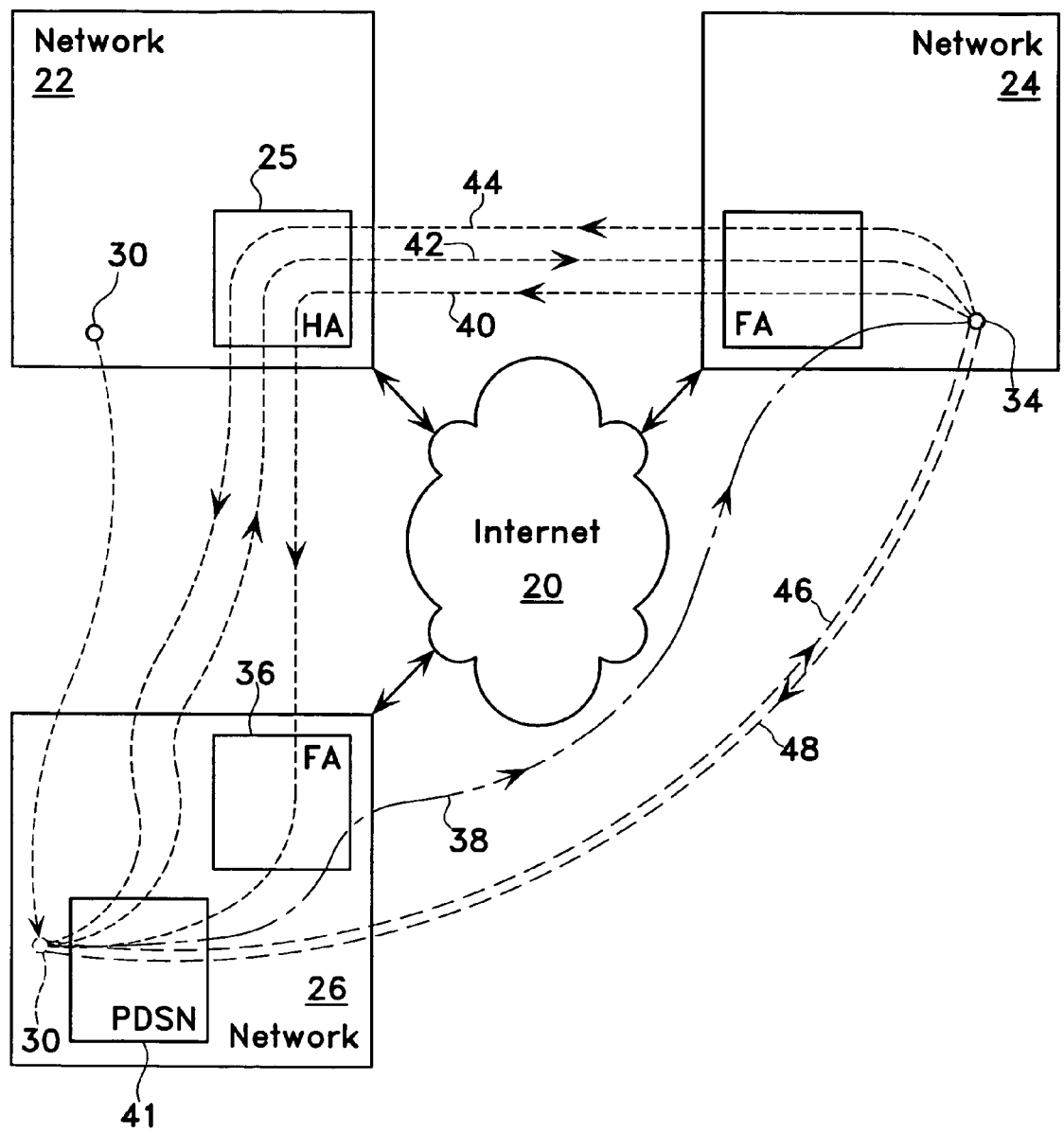
FIG. 1 is a schematic drawing of the global connection of networks.
Figure 2:
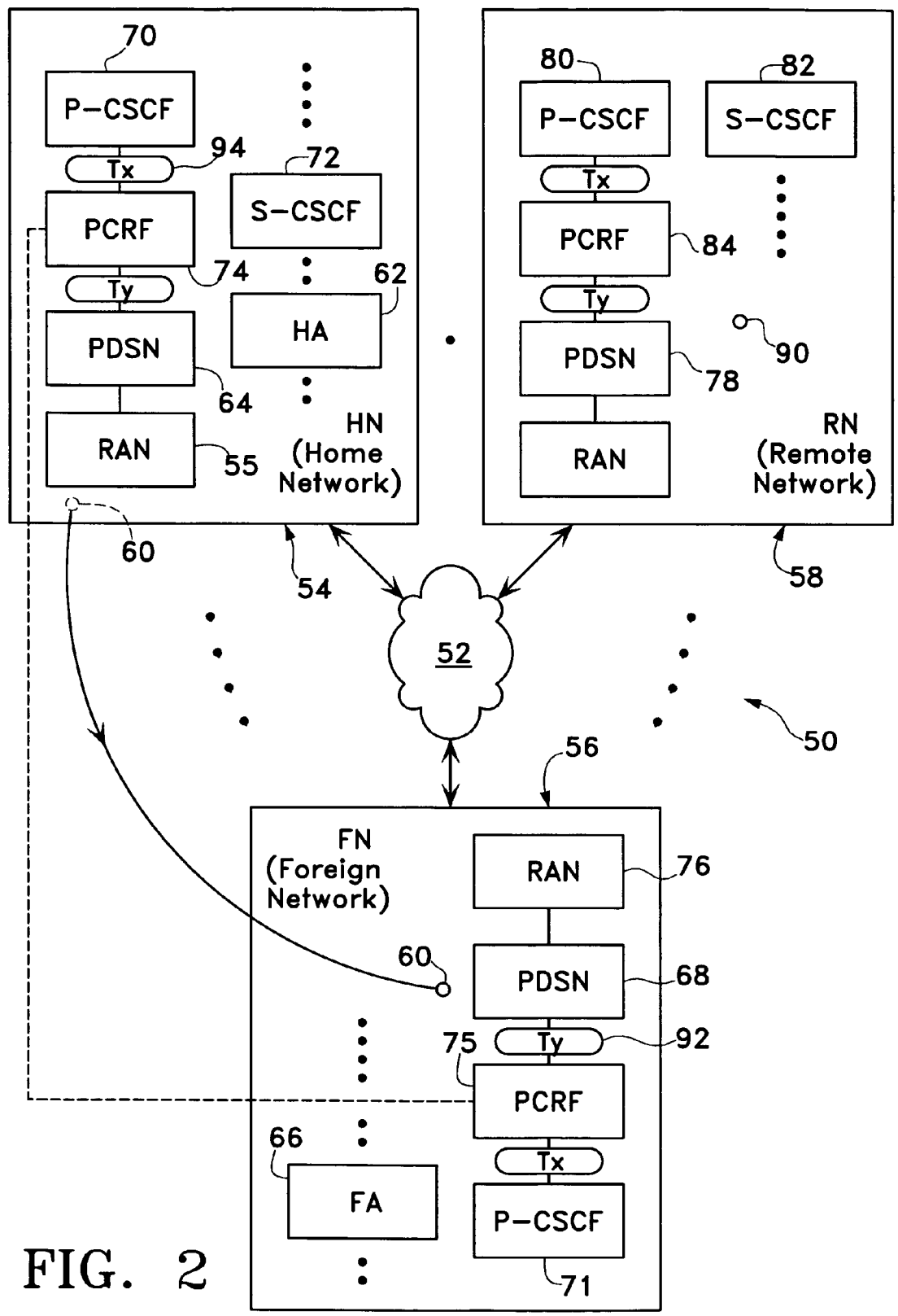
FIG. 2 is a schematic drawing showing an embodiment of the invention.

Reference is now directed to FIG. 2 which schematically shows an exemplary embodiment of the invention. The overall system is generally signified by the reference numeral 50 which includes a backbone network 52, such as an intranet or the Internet.

By way of example, as shown in FIG. 2, connected to the backbone network 52, among other networks, are a HN (Home Network) 54, a FN (Foreign Network) 56, and a RN (Remote Network) 58.

In the HN 54, there is a HA (Home Agent) 62 which assumes the duty of managing data traffic within the HN 54 and also for controlling the data traffic of the HN 54 for inbound and outbound routing. If the HN 54 supports wireless technologies, there is normally a RAN (Radio Access Network) 55 installed and connected to a PDSN (Packet Data Serving Node) 64. For example, if the RAN 55 operates under the cdma2000 standards, the RAN 55 commonly includes at least a BSC (Base Station Controller) and a plurality of BSs (Base Stations). The PDSN 64 in essence is an access gateway between the backbone network 52 and the RAN 55.

To execute the various IMS/MMD functions and features, service providers installed different servers in the HN 54. Examples of such servers include a P-CSCF (Proxy Call State Session Function) 70, and a S-CSCF (Serving Call State Session Function) 72. The functional description of these functions will be depicted later along with the operational description of the system 50.

In addition to the nodes described above, there are other nodes within the HN 54 but are not shown for purpose of clarity. Such nodes can be computers of various scales, printers, and any other devices which can be mobile or non-mobile.

Shown in FIG. 2 are FN 56 and RN 58 linked to the backbone network 52. Furthermore, for simplicity and ease of explanation, the FN 56 and the RN 58 are illustrated as somewhat similar to the HN 54. It should be appreciated that, depending on usage, the FN 56 and RN 58 can be structured very differently. Thus, in this case, the FN 56 also includes, among other things, a FA (Foreign Agent) 66, a RAN 76, a PDSN 68, a P-CSCF 71, and a PCRF (Policy and Charging Rules Function) 75. Likewise, the RN 58 also includes, among other things, a PDSN 78, a P-CSCF 80, a S-CSCF 82, and a PCRF 84.

It should be noted that in FIG. 2, the FA 66 and the PDSN 68 in the FN 56 are shown as separate entities. Very often, the FA 66 and the PDSN 68 are integrated as one unit.

In the system 50, there is a MN (Mobile Node) 60 which is originally registered with the HA 62 in the HN 54 with a HoA (Home Address). The MN 60 is capable of migrating to other foreign networks, such as the FN 56, and can gain access to the backbone network 52 via the FN 56 or other networks under the Mobile IP (Mobile Internet Protocol). The MN 60 in practice can be in the form of a PDA (Personal Digital Assistant), a laptop computer, or a mobile phone, for example.

Suppose the MN 60 is roaming in the FN 56. In this specific example, assume the user of the MN 60 wants to have a video conferencing session with another user operating a CN (Correspondent Node) 90 in the RN 58. The node 90 can be mobile or non-mobile.

Upon reaching the territory of the FN 56, the MN 60 may acquire the address of the FA 66 via advertisement by the FN 56. The MN 60 then registers the FA CoA with the HA 62 in the HN 54 so that the HA 62 can keep track of the locality of the MN 60. As an alternative, the MN 60 may request a CCoA from the FA 66. The MN 60 then also registers the CCoA with the HA 62 for the same reason, that is, to allow the HA 62 to maintain contact with the MN 60.

Prior to establishing any communication traffic, the MN 60 needs to go through a signaling process. To accomplish this end, the MN 60 sends out an invitation message to the CN 90 via an intermediary as will be described below. Likewise, the CN 90 needs to acknowledge the invitation message through a response signaling process.

In this example, the MN 60 uses the HoA originally assigned by the HA 62 in the HN 54 to register with the S-CSCF 72 in the HN 54 for the access of the SIP (Session Initiation Protocol) network which includes the S-CSCF 72 in the HN 54.

The MN 60 then sends a SIP INVITE message to the P-CSCF 70 in the HN 54. It should be noted that in actual operation, as with all other data traffic, the SIP INVITE message first goes through the RAN 76, PDSN 68, the FA 66, the backbone network 52, and the HA 62 before reaching the P-CSCF 70. Furthermore, as well known in the art, the data traffic is in the form of electrical signals via a signal carrier traveling through the system 50. For the sake of clarity in a manner similarly depicted above, the data traffic is simply illustrated as logical paths. That is, in the following description, unless specifically highlighted, only the logical paths of the data traffic are described.

It further should be noted that the MN 60 can send the SIP INVITE message to the P-CSCF 71 in the FN 56 to initiate the conferencing session as an alternative. That is, instead of using the P-CSCF 70 in the HN 54 for signaling, the MN 60 can use the P-CSCF 71 in the FN 56 as an alternative. For consistence and clarity in explanation, in the following description, the SIP network in the HN 54 is used for the signaling process.

Returning to FIG. 2, the SIP INVITE message includes a description portion called the SDP (Session Description Protocol) which in essence describes the basic requirements for the proper execution of the requested video conferencing session. For instance, included in the SDP are the IP address and port number of the MN 60, and the codec specification for the session. More importantly, in this embodiment, the SDP includes the mode of communications to be assumed by the MN 60 for the bearer traffic. The bearer traffic is the content flow of audio and video signals of the conferencing session.

The P-CSCF 70 in the HN 54 is a node assuming the duty of call session management. Upon receipt of the SIP INVITE message, the P-CSCF 70 forwards the SIP INVITE message to the S-CSCF 72 in the HN 54. The S-CSCF 72 in turn sends the SIP INVITE message to the RN 58 for request of acceptance.

Upon approval of the session by the S-CSCF 72 and the acceptance of the conferencing session by the CN 90 in the RN 58, the P-CSCF 70 then sends the policy related information, such as the charging rules, authorized QoS (Quality of Service) and the flow identifiers to the PCRF 68 in the HN 54.

At the same time, that is, after the acceptance by the CN 90, the MN 60 sends a TFT (Traffic Flow Template), along with the requested QoS to the PDSN 68 in the FN 56 to set up the bearer traffic.

The PDSN 68 then requests same policy related information as mentioned earlier, that is, the authorized QoS, charging rules, and the flow identifiers for the conferencing session from the PCRF 75 in the FN 56. The PCRF 75 then relays the request to the PCRF 74 in the HN 54. Any parameters granted by the PCRF 75 have to be in conformance with certain mandated polices. Such policies may include rules dictated under the IMS/MMD standards, specific agreements among networks, such as agreements between the FN 54 and the FN 56 relating to the handling of the bearer traffic, policies particular to a network, such as policies unique only to the FN 56. If the requested conference session is fee-based, the policies may include certain tracking procedures for accounting purposes. Above all, unauthorized traffic will be blocked via a process called packet data filtering as will be described further below. The enforcement of the policies is called SBBC (Service Based Bearer Control) under the IMS/MMD standards.

The operational details of the SBBC can be found in a document entitled, "*3GPP2 MMD Service Based Bearer Control Document, Work in Progress,*" 3GPP2 X.S0013-012. Descriptions of the SDP can be found in the document, entitled "IP Multimedia Call Control Protocol Based on SIP and SDP), Stage 3: 3GPP2-X.S0013-0004.

The PCRF 75 in the FN 56 is installed for the decision of all the imposed polices. In the decision process, the PCRF 75 is interposed between the PCRF 74 in the HN 54 and the PDSN 68 in the FN 56. Furthermore, there is a Ty interface 92 interposed between the PDSN 68 and the PCRF 75. There is also a Tx interface 94 disposed between the PCRF 74 and the P-CSCF 70 in the HN 64 as shown in FIG. 2. The aforementioned Ty and Tx interfaces are used for policy control between the conferencing session and the bearer traffic. Details of the Ty and Tx interfaces can be found in the documents, 3GPP TS 23.107 published by 3GPP, and 3GPP2 X.P0013-012 published by 3GPP2.

Returning now to FIG. 2, the requested session parameters stated in the SIP INVITE message, if authorized, are passed to the PDSN 68 from the P-CSCF 70 via the PCRF 74 in the HN 54 and the PCRF 75 in the FN 56.

In this embodiment, the CN 90 is assumed to have a CCoA which is assigned by the RN 58. Thus, upon receipt of the SIP INVITE messages, the CN 90 responds back with a SIP 200 OK message. The SIP 200 OK message basically reaffirms the parameters of the original SIP INVITE message. In addition, in this embodiment, the CN 90 includes in the SDP of the SIP 200 OK message the mode of communications to be undertaken by the CN 90 for the bearer traffic. The SIP 200 OK follows the same data path as the SIP INVITE message but in the reverse order.

The MN 60 then confirms the receipt of the SIP 200 OK message by sending an acknowledge message (ACK) back along the same data path as the original SIP INVITE message.

Bearer traffic is thereafter ready to be established by the PDSN 68 in the FN 56 in accordance with the authorized parameters as set forth in the SIP INVITE message.

Under the IMS/MMD standards, bearer traffic needs to be monitored and controlled via the SBBC by the network. In this example, as mentioned before, the PDSN 68 directed by the PCRF 75 in the FN 56 enforces the SBBC to conform with the polices as aforementioned.

During SBBC enforcement, each data packet needs to be screened before allowed to pass through. The process is called packet data filtering. The mechanisms implemented to carry out the filtering process are called filters. Details of packet data filtering can be found in the document, entitled "*3GPP2 MMD Service Based Bearer Control Document, Work in Progress*," supra.

Specifically, criteria need to be built into the filters. Among other things, the source and destination addresses of each data packet need to be ascertained. As mentioned earlier, in each data packet, the formats and configurations of addresses are different in different modes of communications. For example, in the communication mode under Mobile IP tunnel mode, each data packet has two layers of addresses. The PDSN 68 can inspect each data packet to determine the different format and configuration of the addresses in order to set up the filters. Such inspecting and determining processes involve considerable resources. Furthermore, it is a relatively complex undertaking. For instance, there are three modes of communications available for the MN 30 to choose from. As described earlier, they are namely, the Simple IP mode, the Mobile IP tunnel mode, and the Mobile IP route optimized mode. The same holds true with the CN 90. That is, the CN 90 can also assume one of the three modes of communications. Consequently, there should be at least a total of 9 sets of filters for the PDSN 68 to decide and to deal with.

In accordance with this embodiment, instead of asking the PDSN 68 to inspect the data packets to come up with the correct set of filters, the PDSN 68 is directly informed of the modes of communications of the communicating nodes.

Thus, as mentioned earlier, in the SDP portion of the SIP INVITE message, other than the required information such as the source and destination addresses, and the destination port, and so forth, the MN 60 includes in the SDP in the mode of communications to be exercised by the MN 60 for the requested communication session.

Likewise, in the SIP 200 OK message, other than the required information such as the source and destination address, and the destination port, etc., the CN 90 also includes in the SDP the mode of communications to be deployed by the CN 90.

The PDSN 68 then knows the modes of communications of the communicating nodes MN 60 and CN 90 well in advance from the SIP INVITE and SIP 200 OK messages, respectively. Thereafter, upon authorization by the PCRF 75 in the FN 56, sets up the appropriate filters accordingly. Bearer traffic is then established through the filters. Only data packets that meet the criteria of the filters are allowed to pass through the PDSN 68. On the other hand, nonconforming data packets are simply dropped.

Operating in the manner as described above, that is, under the modes of communications directly included in the SDP, the PDSN can set up filters swiftly to enforce the SBBC for the requested video conferencing session. The enforcement of the SBBC is continuous until the session between the MN 60 and the CN 90 is terminated.

Figure 3:
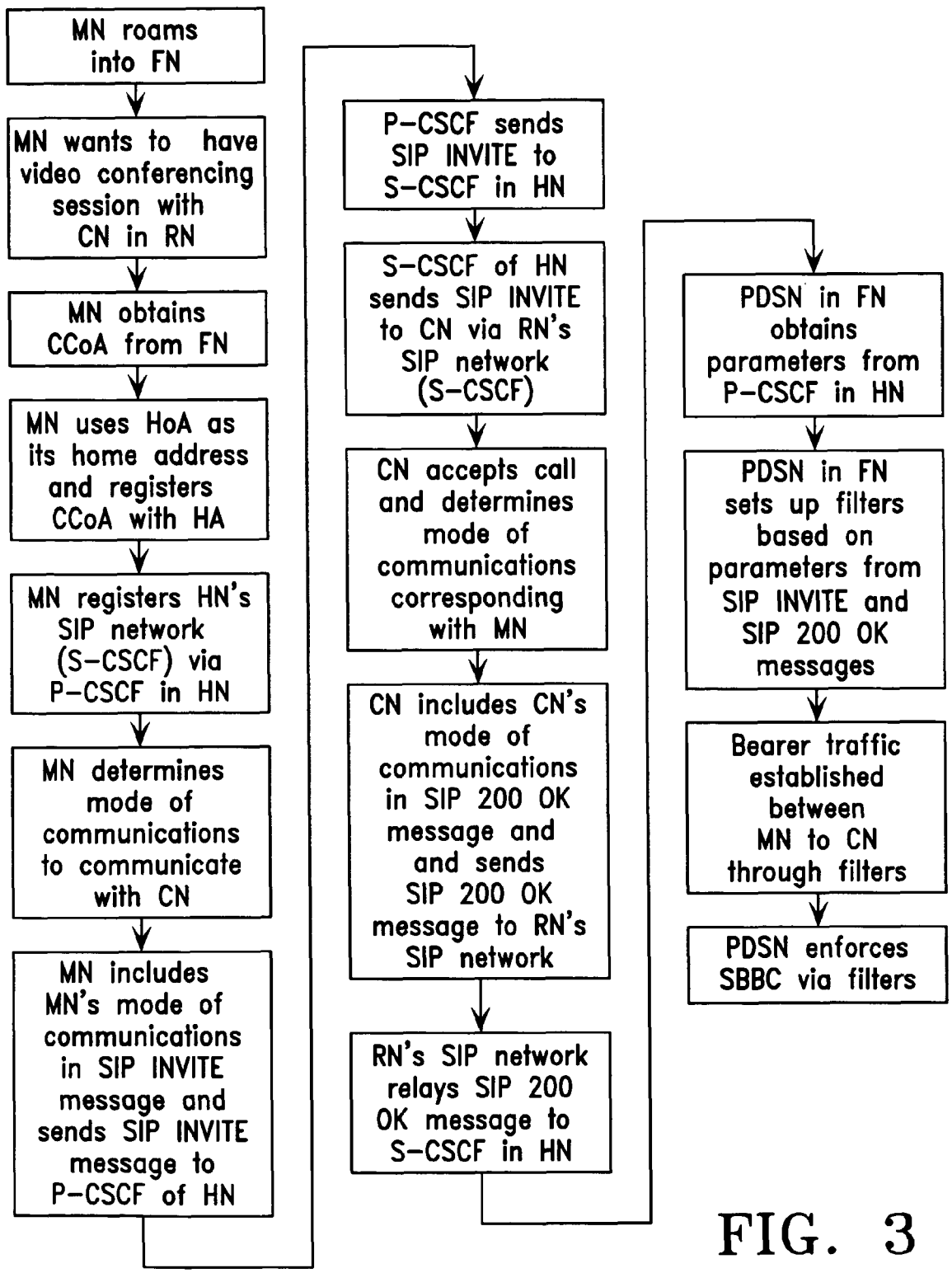
FIG. 3 is a flowchart showing the steps for initiation signaling and establishing content traffic in accordance with the embodiment of the invention.

The process as stated above is shown in the flowchart of FIG. 3.

Figure 4:
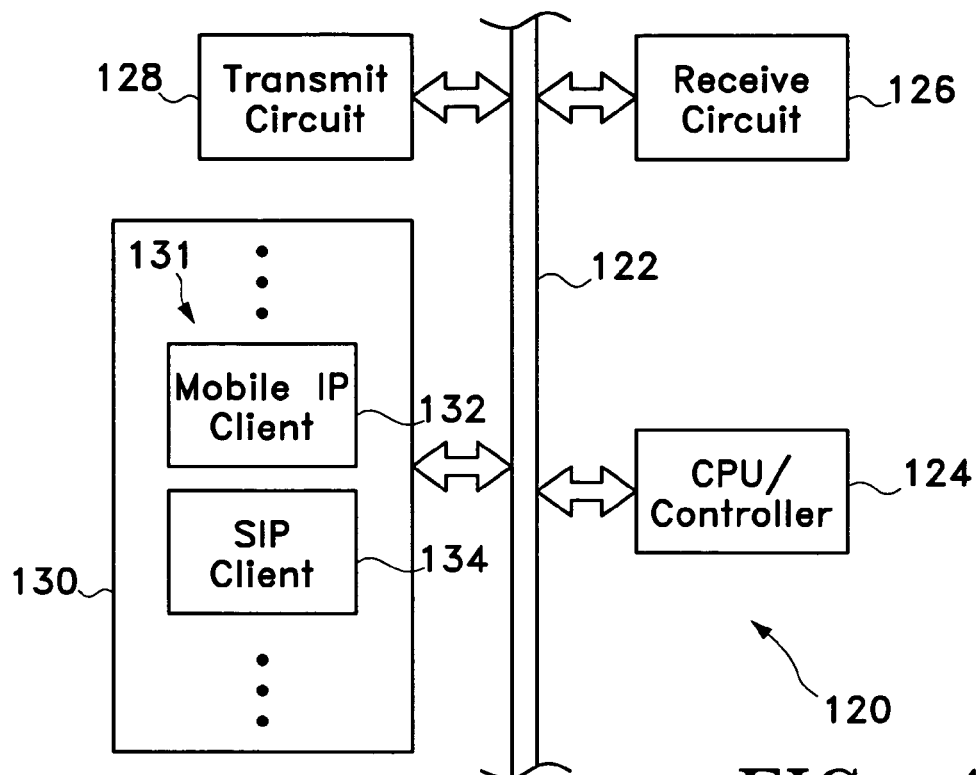
FIG. 4 is a schematic drawing of the circuitry of a mobile node configured in accordance with the invention.

FIG. 4 schematically shows the part of the hardware implementation of a mobile node apparatus signified by the reference numeral 120 in accordance with the invention. The apparatus 120 can be built and incorporated in various devices, such as a laptop computer, a PDA, or a cellular phone, for example The apparatus 120 comprises a central data bus 122 linking several circuits together. The circuits include a CPU (Central Processing Unit) or a controller 124, a receive circuit 126, a transmit circuit 128, and a memory unit 130.

The receive and transmit circuits 126 and 128 can be connected to a RF (Radio Frequency) circuit but is not shown in the drawing. The receive circuit 126 processes and buffers received signals before sending out to the data bus 122. On the other hand, the transmit circuit 128 processes and buffers the data from the date bus 122 before sending out of the device 120. The CPU/controller 124 performs the function of data management of the data bus 122 and further the function of general data processing, including executing the instructional contents of the memory unit 130.

The memory unit 130 includes a set of instructions generally signified by the reference numeral 131. In this embodiment, the instructions include, among other things, portions such as the Mobile IP client 132 and the SIP client 134. The SIP client 134 includes the instructional sets in accordance with the invention as described previously. The Mobile IP client 132 includes the instructional sets for allowing the apparatus 120 to operate under the IP and the Mobile IP, such as acquiring various types of addresses for the various modes of communications, also as described above.

In this embodiment, the memory unit 130 is a RAM (Random Access Memory) circuit. The exemplary instruction portions 132 and 134 are software routines or modules. The memory unit 130 can be tied to another memory circuit (not shown) which can either be of the volatile or nonvolatile type. As an alternative, the memory unit 130 can be made of other circuit types, such as an EEPROM (Electrically Erasable Programmable Read Only Memory), an EPROM (Electrical Programmable Read Only Memory), a ROM (Read Only Memory), a magnetic disk, an optical disk, and others well known in the art.

Figure 5:
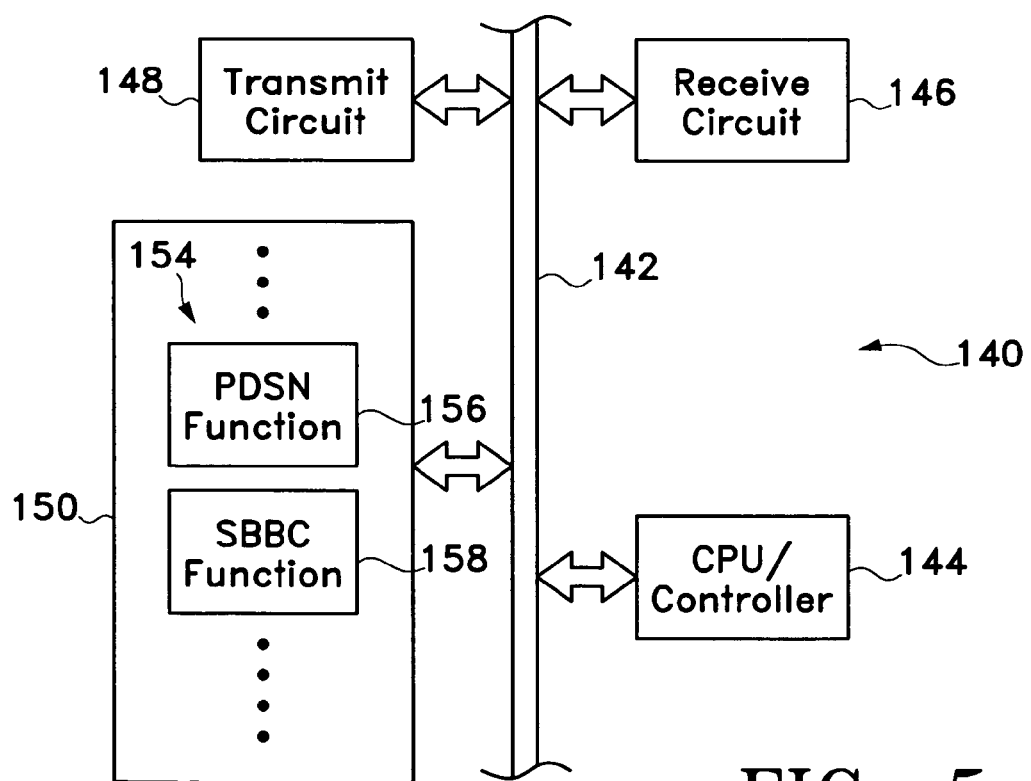
FIG. 5 is a schematic drawing of the circuitry of a monitoring intermediary in accordance with the invention.

FIG. 5 schematically shows the part of the hardware implementation of the PDSN apparatus in accordance with the invention and is signified by the reference numeral 140. The PDSN apparatus 140 comprises a central data bus 142 linking several circuits together. The circuits include a CPU (Central Processing Unit) or a controller 144, a receive circuit 146, a transmit circuit 148, and a memory unit 150.

The receive and transmit circuits 146 and 148 can be connected to a network data bus (not shown) where the PDSN apparatus 140 is linked to. The receive circuit 146 processes and buffers received signals from the network data bus (not shown) before routing to the internal data bus 142. The transmit circuit 148 processes and buffers the data from the date bus 142 before sending out of the apparatus 140. The CPU/controller 144 performs the duty of data management of the data bus 142 and for the function of general data processing, including executing the instructional content of the memory circuit 150.

The memory circuit 150 includes a set of instructions generally signified by the reference numeral 154. In this embodiment, the instructions include portions, among other things, a PDSN function 156 and a SBBC function 158. The memory circuit can be made of memory circuit types as mentioned above and are not further repeated.

Finally, described in the embodiment is the MN 60 operating under the Mobile IP using the CCoA. As mentioned before, the MN 60 can well operate under other modes of communications and assume other types of addresses. For instance, the MN 60 can certainly use the CCoA under the Mobile IP route optimized mode. As yet another example out of the many alternatives, the MN 60 can use the FA CoA and communicate with the CN 90 under the Mobile IP tunnel mode. In addition, filters need not be bidirectional as described in the embodiment. It is conceivable to have one-way filters. For example, the MN 60 can include its mode of communications in the SDP to set up the one-way filter without requiring the CN 90 to provide the same in reverse. Moreover, as described, the node 60 is depicted as a mobile device roaming to a foreign network. It should be understood that the node 60 can very well be stationary. In addition, any logical blocks, circuits, and algorithm steps described in connection with the embodiments can be implemented in hardware, software, firmware, or combinations thereof. It will be understood by those skilled in the art that theses and other changes in form and detail may be made therein without departing from the scope and spirit of the invention.

What is claimed is:

1. A method for a communication session of packet data through a monitoring intermediary comprising a processor and a memory, the method comprising:

determining, via the memory, a communication mode for said communication session, the communication mode corresponding to one of a plurality of Internet Protocol (IP)-routing protocols for the communication session;

sending a signaling message through the processor of said monitoring intermediary during said communication session, the signaling message configured to include an indication of a communication mode selected from a group consisting of a simple IP mode, a mobile IP tunnel mode, and a mobile IP route optimized mode; and communicating said packet data through said monitoring intermediary using said communication mode during said communication session.

2. The method as in claim 1 wherein said sending comprises preparing parameters including said communication mode in an invite message and sending said invite message through said monitoring intermediary.

3. The method as in claim 1 wherein said sending includes responding through said monitoring intermediary to an invitation to said communication session.

4. A method for a communication session of packet data through a monitoring intermediary comprising a processor and a memory in a communication system supported by the IP (Internet Protocol), the method comprising:

determining, via the memory, a communication mode selected from a group consisting of a simple IP mode, a mobile IP tunnel mode, and a mobile IP route optimized mode;

including, via the processor, said communication mode in a signaling message selected from a group consisting of a SIP INVITE message and a SIP 200 OK message; and signaling for said communication session by sending said signaling message having said communication mode through said monitoring intermediary so as to allow said monitoring intermediary using information of said communication mode for packet data monitoring.

5. A method for establishing, via a processor, a communication session of packet data, the method comprising:

receiving a signaling message for said communication session, and the received signaling message including an indication of a communication mode selected from a group consisting of a simple IP mode, a mobile IP tunnel mode, and a mobile IP route optimized mode for the communication; and enforcing, via the processor, a set of policies which requires information provided by said communication mode on said communication session.

6. The method as in claim 5 wherein said signaling message being a first signaling message and said communication mode being a first communication mode, said method further including receiving a second communication mode from a second signaling message.

7. The method as in claim 6 wherein said first signaling message being an invitation message for said communication session, and said second signaling message being a response message for said invitation message.

8. A method for establishing, via a processor, a communication session of packet data in a communication system supported by the IP (Internet Protocol), comprising:

receiving a signaling message selected from a group consisting of a SIP INVITE message and a SIP 200 OK message;

obtaining from said signaling message a communication mode for the communication session that is selected from a group consisting of a simple IP mode, a mobile IP tunnel mode, and a mobile IP route optimized mode; and enforcing, via the processor, a set of policies which requires information provided by said communication mode on said communication session.

9. An apparatus for a communication session of packet data through a monitoring intermediary, comprising:

means for determining a communication mode for said communication session, the communication mode corresponding to one of a plurality of Internet Protocol (IP)-routing protocols for the communication session;

means for sending a signaling through said monitoring intermediary for use of said communication mode during said communication session of packet data, the signaling message configured to include an indication of the communication mode selected from a group consisting of a simple IP mode, a mobile IP tunnel mode, and a mobile IP route optimized mode; and means for communicating said packet data through said monitoring intermediary using said communication mode during said communication session.

10. The apparatus as in claim 9 wherein said means for sending includes means for sending an invite message having said communication mode through said monitoring intermediary.

11. The apparatus as in claim 9 wherein said means for sending includes means for responding through said monitoring intermediary to an invitation to said communication session.

12. An apparatus for a communication session of packet data through a monitoring intermediary in a communication system supported by the IP (Internet Protocol), comprising:

means for determining a communication mode selected from a group consisting of a simple IP mode, a mobile IP tunnel mode, and a mobile IP route optimized mode;

means for including said communication mode in a signaling message selected from a group consisting of a SIP INVITE message and a SIP 200 OK message; and means for signaling for said communication session by sending said signaling message having said communication mode through said monitoring intermediary so as to allow said monitoring intermediary using information of said communication mode for packet data monitoring.

13. An apparatus for a communication session of packet data, comprising:

means for receiving a signaling message for said communication session, the received signaling message including an indication of a communication mode selected from a group consisting of a simple IP mode, a mobile IP tunnel mode, and a mobile IP route optimized mode for the communication; and means for enforcing a set of policies which requires information provided by said communication mode on said communication session.

14. The apparatus as in claim 13 wherein said signaling message being a first signaling message and said communication mode being a first communication mode, said apparatus further including means for receiving a second communication mode from a second signaling message.

15. The apparatus as in claim 14 wherein said first signaling message being an invitation message for said communication session, and said second signaling message being a response message for said invitation message.

16. An apparatus for a communication session of packet data in a communication system supported by the IP (Internet Protocol), comprising:

means for receiving a signaling message selected from a group consisting of a SIP INVITE message and a SIP 200 OK message;

means for obtaining from said signaling message a communication mode for the communication session that is selected from a group consisting of a simple IP mode, a mobile IP tunnel mode, and a mobile IP route optimized mode; and means for enforcing a set of policies which requires information provided by said communication mode on said communication session.

17. An apparatus for a communication session of packet data through a monitoring intermediary, comprising:
- a memory unit having computer-readable instructions for determining a communication mode for said communication session, the communication mode corresponding to one of a plurality of Internet Protocol (IP)-routing protocols for the communication session, sending a signaling message through said monitoring intermediary during said communication session, the signaling message configured to include an indication of a communication mode selected from a group consisting of a simple IP mode, a mobile IP tunnel mode, and a mobile IP route optimized mode, and communicating said packet data through said monitoring intermediary using said communication mode during said communication session; and
- a processor circuit coupled to said memory unit for processing said computer-readable instructions.

18. The apparatus as in claim 17 wherein said memory unit further including computer-readable instructions for preparing parameters including said communication mode in an invite message and sending said invite message through said monitoring intermediary.

19. The apparatus as in claim 17 wherein said memory unit further including computer-readable instructions for signaling through said monitoring intermediary in response to an invitation to said communication session.

20. An apparatus for a communication session of packet data through a monitoring intermediary in a communication system supported by the IP (Internet Protocol), comprising:
- a memory unit having computer-readable instructions for determining a communication mode selected from a group consisting of a simple IP mode, a mobile IP tunnel mode, and a mobile IP route optimized mode, including said communication mode in a signaling message selected from a group consisting of a SIP INVITE message and a SIP 200 OK message, and signaling for said communication session by sending said signaling message having said communication mode through said monitoring intermediary so as to allow said monitoring intermediary using information of said communication mode for packet data monitoring; and
- a processor circuit coupled to said memory unit for processing said computer-readable instructions.

21. An apparatus for a communication session of packet data, comprising:
- a memory unit having computer-readable instructions for receiving a signaling message for said communication session, the received signaling message including an indication of a communication mode selected from a group consisting of a simple IP mode, a mobile IP tunnel mode, and a mobile IP route optimized mode for the communication, and enforcing a set of policies which requires information provided by said communication mode on said communication session of packet data; and
- a processor circuit coupled to said memory unit for processing said computer-readable instructions.

22. The apparatus as in claim 21 wherein said signaling message being a first signaling message and said communication mode being a first communication mode, said memory unit further including computer-readable instructions for receiving a second communication mode from a second signaling message.

23. The apparatus as in claim 22 wherein said first signaling message being an invitation message for said communication session of packet data, and said second signaling message being a response message for said invitation message.

24. An apparatus for a packet data communication in a communication system supported by the IP (Internet Protocol), comprising:
- a memory unit having computer-readable instructions for receiving a signaling message selected from a group consisting of a SIP INVITE message and a SIP 200 OK message, obtaining from said signaling message a communication mode for the communication session that is selected from a group consisting of a simple IP mode, a mobile IP tunnel mode, and a mobile IP route optimized mode, and for enforcing a set of policies which requires information provided by said communication mode on said communication session of packet data; and
- a processor circuit coupled to said memory unit for processing said computer-readable instructions.

25. A non-transitory computer-readable storage medium comprising instructions, which, when executed by an apparatus in a wireless communications system, cause the apparatus to perform operations, the instructions comprising:
- a first set of codes for determining a communication mode for a communication session of packet data, the communication mode corresponding to one of a plurality of IP-routing protocols for the communication session; and
- a second set of codes for sending an initial signaling message through the processor of said monitoring intermediary during said communication session of packet data, the signaling message configured to include an indication of a communication mode selected from a group consisting of a simple IP mode, a mobile IP tunnel mode, and a mobile IP route optimized mode; and
- a third set of codes for communicating said packet data through said monitoring intermediary using said communication mode during said communication session.

26. A non-transitory computer-readable storage medium comprising instructions, which, when executed by an apparatus in a wireless communications system, cause the apparatus to perform operations, the instructions comprising:
- a first set of codes for receiving a signaling message for a communication session of packet data, the received signaling message including an indication of a communication mode selected from a group consisting of a simple IP mode, a mobile IP tunnel mode, and a mobile IP route optimized mode for the communication; and
- a second set of codes for enforcing a set of policies which requires information provided by said communication mode on said communication session of packet data.

27. The method of claim 1, further comprising:
blocking the packet data upon determining, via the monitoring intermediary, that the packet data is unauthorized.

28. The method of claim 4, wherein, upon determining, via the monitoring intermediary, that the packet data is unauthorized, the packet data is blocked.

29. The method of claim 1,
wherein the monitoring intermediary corresponds to a packet data serving node (PDSN), and
wherein the signaling message functions as an explicit indication of the communication mode for the communication session such that the PDSN need not inspect individual data packets exchanged during the communication session to determine the communication mode.

30. A non-transitory computer-readable storage medium comprising instructions, which, when executed by an apparatus in a wireless communications system, cause the apparatus to perform operations for a communication session of packet data through a monitoring intermediary, the instructions comprising:

a first set of computer codes for determining, via the memory, a communication mode selected from a group consisting of a simple IP mode, a mobile IP tunnel mode, and a mobile IP route optimized mode;

a second set of computer codes for including, via the processor, said communication mode in a signaling message selected from a group consisting of a SIP INVITE message and a SIP 200 OK message; and a third set of computer codes for signaling for said communication session by sending said signaling message having said communication mode through said monitoring intermediary so as to allow said monitoring intermediary using information of said communication mode for packet data monitoring.

31. A non-transitory computer-readable storage medium comprising instructions, which, when executed by an apparatus in a wireless communications system, cause the apparatus to perform operations for a communication session of packet data through a monitoring intermediary, the instructions comprising:

a first set of computer codes for receiving a signaling message selected from a group consisting of a SIP INVITE message and a SIP 200 OK message;

a second set of computer codes for obtaining from said signaling message a communication mode for the communication session that is selected from a group consisting of a simple IP mode, a mobile IP tunnel mode, and a mobile IP route optimized mode; and a third set of computer codes for enforcing, via the processor, a set of policies which requires information provided by said communication mode on said communication session.

32. A method for a communication session of packet data between two nodes through a monitoring intermediary comprising a processor and a memory, the method comprising:

sending during initial signaling processing, each of said node's selected communication mode to a PDSN operating as said monitoring intermediary during said communication session, each of said communication modes corresponding to one of a plurality of Internet Protocol (IP)-routing protocols for the communication session;

creating appropriate data packet filters at said PDSN based on each of said node's selected communication mode; and communicating said packet data meeting the criteria of said filters through said monitoring intermediary using said communication mode during said communication session.

33. An apparatus for a communication session of packet data between two nodes through a monitoring intermediary, comprising:

means for sending, during initial signaling processing, each of said node's selected communication mode to a PDSN operating as said monitoring intermediary, each said communication mode corresponding to one of a plurality of Internet Protocol (IP) routing protocols for the communication session;

means for creating appropriate data packet filters at said PDSN based on each of said node's selected communication mode; and means for communicating packet data meeting the criteria of said filters through said monitoring intermediary using said communication mode during said communication session.

34. An apparatus for a communication session of packet data, comprising:

a memory unit having computer-readable instructions for receiving during initial signaling processing for a communication session of packet data between two nodes through a monitoring intermediary, each of said node's selected communication mode at a PDSN operating as said monitoring intermediary during said communication session, each of said communication modes corresponding to one of a plurality of Internet Protocol (IP)-routing protocols for the communication session; creating appropriate data packet filters at said PDSN based on each of said node's selected communication mode; and communicating said packet data meeting the criteria of said filters through said monitoring intermediary using said communication mode during said communication session; and a processor circuit coupled to said memory unit for processing said computer-readable instructions.

35. A non-transitory computer-readable storage medium comprising instructions, which, when executed by an apparatus in a wireless communications system, cause the apparatus to perform operations, the instructions comprising:

a first set of codes for receiving during initial signaling processing for a communication session of packet data between two nodes through a monitoring intermediary, each of said node's selected communication mode at a PDSN operating as said monitoring intermediary during said communication session, each of said communication modes corresponding to one of a plurality of Internet Protocol (IP)-routing protocols for the communication session;

creating appropriate data packet filters at said PDSN based on each of said node's selected communication mode; and communicating said packet data meeting the criteria of said filters through said monitoring intermediary using said communication mode during said communication session.

* * * * *